(12) United States Patent
Hall et al.

(10) Patent No.: US 8,728,382 B2
(45) Date of Patent: May 20, 2014

(54) FORMING A POLYCRYSTALLINE CERAMIC IN MULTIPLE SINTERING PHASES

(76) Inventors: David R. Hall, Provo, UT (US); Ronald B. Crockett, Payson, UT (US)

( * ) Notice: Subject to any disclaimer, the term of this patent is extended or adjusted under 35 U.S.C. 154(b) by 471 days.

(21) Appl. No.: 13/074,276

(22) Filed: Mar. 29, 2011

(65) Prior Publication Data

US 2012/0248663 A1 Oct. 4, 2012

(51) Int. Cl.
*C04B 35/645* (2006.01)

(52) U.S. Cl.
CPC .................... *C04B 35/6455* (2013.01)
USPC ......................................................... 264/604

(58) Field of Classification Search
USPC ......................................................... 264/604
See application file for complete search history.

(56) References Cited

U.S. PATENT DOCUMENTS

| | | |
|---|---|---|
| 2,004,315 A | 6/1935 | Fean |
| 2,124,438 A | 7/1938 | Struk |
| 3,254,392 A | 6/1966 | Novkov |
| 3,746,396 A | 7/1973 | Radd |
| 3,807,804 A | 4/1974 | Kniff |
| 3,830,321 A | 8/1974 | McKenry |
| 3,932,952 A | 1/1976 | Helton |
| 3,945,681 A | 3/1976 | White |
| 4,005,914 A | 2/1977 | Newman |
| 4,006,936 A | 2/1977 | Crabiel |
| 4,098,362 A | 7/1978 | Bonnice |
| 4,109,737 A | 8/1978 | Bovenkerk |
| 4,156,329 A | 5/1979 | Daniels |
| 4,199,035 A | 4/1980 | Thompson |
| 4,201,421 A | 5/1980 | Den Besten |
| 4,224,380 A | 9/1980 | Bovenkerk |
| 4,277,106 A | 7/1981 | Sahley |
| 4,439,250 A | 3/1984 | Acharya |
| 4,465,221 A | 8/1984 | Schmidt |
| 4,484,644 A | 11/1984 | Cook |
| 4,489,986 A | 12/1984 | Dziak |
| 4,518,659 A | 5/1985 | Gigl |
| 4,682,987 A | 7/1987 | Brady |
| 4,688,856 A | 8/1987 | Elfgen |
| 4,725,098 A | 2/1988 | Beach |
| 4,726,718 A | 2/1988 | Meskin |
| 4,729,603 A | 3/1988 | Elfgen |
| 4,765,686 A | 8/1988 | Adams |
| 4,765,687 A | 8/1988 | Parrott |
| 4,776,862 A | 10/1988 | Wiand |
| 4,880,154 A | 11/1989 | Tank |
| 4,907,377 A | 3/1990 | Csillag |
| 4,932,723 A | 6/1990 | Mills |
| 4,940,288 A | 7/1990 | Stiffler |
| 4,944,559 A | 7/1990 | Sionnet |
| 4,944,772 A | 7/1990 | Cho |
| 4,951,762 A | 8/1990 | Lundell |

(Continued)

*Primary Examiner* — Joseph S Del Sole
*Assistant Examiner* — Russell Kemmerle, III
(74) *Attorney, Agent, or Firm* — Philip W. Townsend, III

(57) ABSTRACT

In one aspect of the invention, a method of forming polycrystalline diamond comprises providing a can assembly comprising a preform of diamond powder with a first catalyst, the preform being adjacent a solid substrate with a second catalyst. The pressure and/or temperature on the can assembly increases until the first catalyst and carbon from the diamond powder begin to form a melting composition within the preform. The pressure and temperature may be held substantially constant on the can assembly until the melting composition has catalyzed crystalline growth in at least a portion of the preform. The pressure and/or temperature are then increased on the assembly until the second catalyst within the substrate is released into the preform.

20 Claims, 11 Drawing Sheets

(56) References Cited

U.S. PATENT DOCUMENTS

| | | | | |
|---|---|---|---|---|
| 5,011,515 | A | 4/1991 | Frushour | |
| 5,112,165 | A | 5/1992 | Hedlund | |
| 5,141,289 | A | 8/1992 | Stiffler | |
| 5,154,245 | A | 10/1992 | Waldenstrom | |
| 5,186,892 | A | 2/1993 | Pope | |
| 5,251,964 | A | 10/1993 | Ojanen | |
| 5,304,342 | A * | 4/1994 | Hall et al. | 419/11 |
| 5,332,348 | A | 7/1994 | Lemelson | |
| 5,417,475 | A | 5/1995 | Graham | |
| 5,447,208 | A | 9/1995 | Lund | |
| 5,535,839 | A | 7/1996 | Brady | |
| 5,542,993 | A | 8/1996 | Rabinkin | |
| 5,645,617 | A * | 7/1997 | Frushour | 51/309 |
| 5,653,300 | A | 8/1997 | Lund | |
| 5,738,698 | A | 4/1998 | Kapoor | |
| 5,823,632 | A | 10/1998 | Burkett | |
| 5,837,071 | A | 11/1998 | Andersson | |
| 5,845,547 | A | 12/1998 | Sollami | |
| 5,875,862 | A | 3/1999 | Jurewicz | |
| 5,934,542 | A | 8/1999 | Nakamura | |
| 5,935,718 | A | 8/1999 | Demo | |
| 5,944,129 | A | 8/1999 | Jensen | |
| 5,967,250 | A | 10/1999 | Lund | |
| 5,992,405 | A | 11/1999 | Sollami | |
| 6,006,846 | A | 12/1999 | Tibbitts | |
| 6,019,434 | A | 2/2000 | Emmerich | |
| 6,044,920 | A | 4/2000 | Massa | |
| 6,051,079 | A | 4/2000 | Andersson | |
| 6,056,911 | A | 5/2000 | Griffin | |
| 6,065,552 | A | 5/2000 | Scott | |
| 6,113,195 | A | 9/2000 | Mercier | |
| 6,193,770 | B1 | 2/2001 | Sung | |
| 6,196,636 | B1 | 3/2001 | Mills | |
| 6,196,910 | B1 | 3/2001 | Johnson | |
| 6,199,956 | B1 | 3/2001 | Kammerer | |
| 6,216,805 | B1 | 4/2001 | Lays | |
| 6,270,165 | B1 | 8/2001 | Peay | |
| 6,341,823 | B1 | 1/2002 | Sollami | |
| 6,354,771 | B1 | 3/2002 | Bauschulte | |
| 6,364,420 | B1 | 4/2002 | Sollami | |
| 6,371,567 | B1 | 4/2002 | Sollami | |
| 6,375,272 | B1 | 4/2002 | Ojanen | |
| 6,419,278 | B1 | 7/2002 | Cunningham | |
| 6,478,383 | B1 | 11/2002 | Ojanen | |
| 6,499,547 | B2 | 12/2002 | Scott | |
| 6,517,902 | B2 | 2/2003 | Drake | |
| 6,562,462 | B2 | 5/2003 | Griffin | |
| 6,592,985 | B2 | 7/2003 | Griffin | |
| 6,601,662 | B2 | 8/2003 | Mattias | |
| 6,692,083 | B2 | 2/2004 | Latham | |
| 6,709,065 | B2 | 3/2004 | Peay | |
| 6,719,074 | B2 | 4/2004 | Tsuda | |
| 6,733,087 | B2 | 5/2004 | Hall | |
| 6,739,327 | B2 | 5/2004 | Sollami | |
| 6,758,530 | B2 | 7/2004 | Sollami | |
| 6,786,557 | B2 | 9/2004 | Montgomery, Jr. | |
| 6,824,225 | B2 | 11/2004 | Stiffler | |
| 6,851,758 | B2 | 2/2005 | Beach | |
| 6,854,810 | B2 | 2/2005 | Montgomery, Jr. | |
| 6,861,137 | B2 | 3/2005 | Griffin | |
| 6,889,890 | B2 | 5/2005 | Yamazaki | |
| 6,966,611 | B1 | 11/2005 | Sollami | |
| 6,994,404 | B1 | 2/2006 | Sollami | |
| 7,204,560 | B2 | 4/2007 | Mercier | |
| 2002/0175555 | A1 | 11/2002 | Mercier | |
| 2003/0141350 | A1 | 7/2003 | Noro | |
| 2003/0234280 | A1 | 12/2003 | Cadden | |
| 2005/0044800 | A1* | 3/2005 | Hall et al. | 51/307 |
| 2005/0159840 | A1 | 7/2005 | Lin | |
| 2005/0173966 | A1 | 8/2005 | Mouthaan | |
| 2006/0196698 | A1* | 9/2006 | Hall et al. | 175/327 |
| 2007/0295496 | A1* | 12/2007 | Hall et al. | 165/185 |
| 2009/0263308 | A1* | 10/2009 | Hall et al. | 423/446 |
| 2010/0071964 | A1* | 3/2010 | Hall et al. | 175/434 |

* cited by examiner

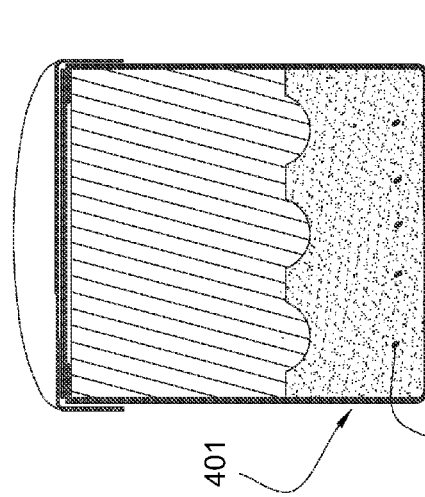
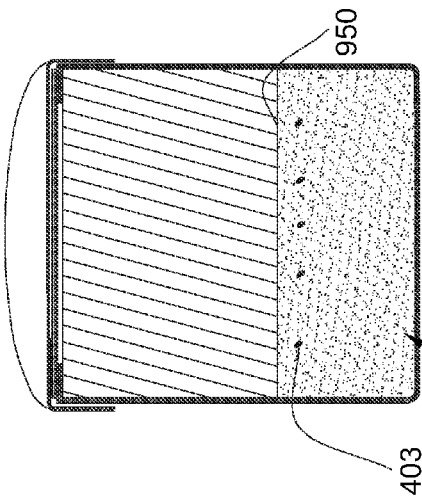
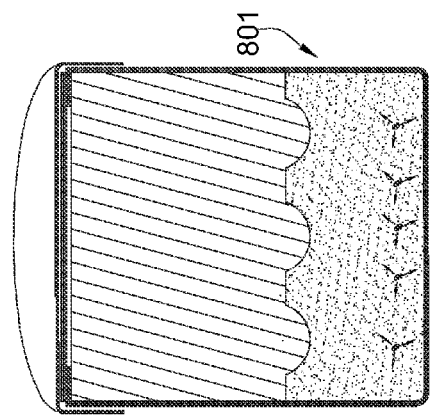
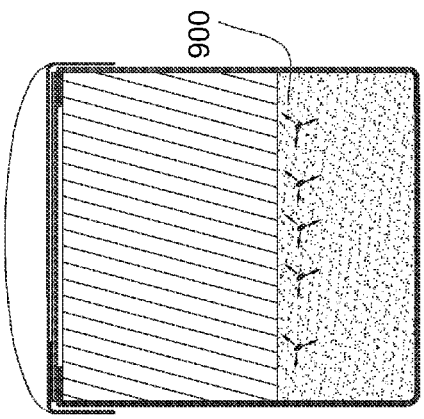
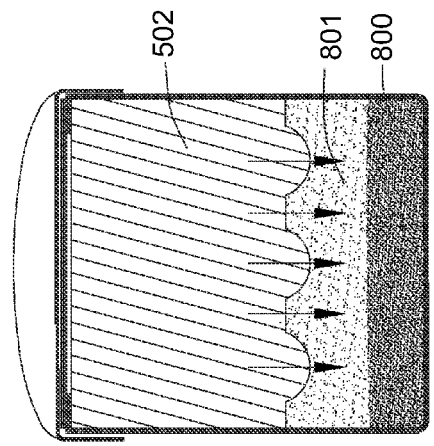
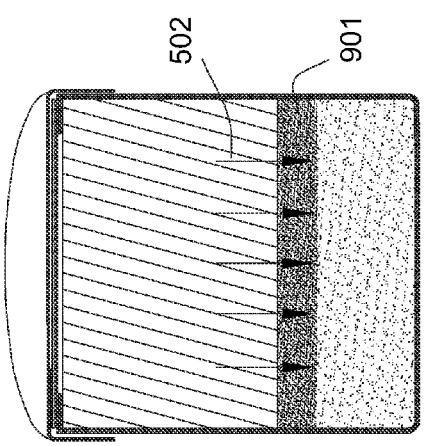

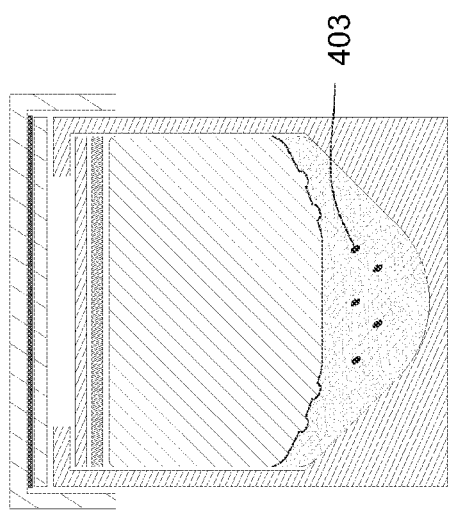
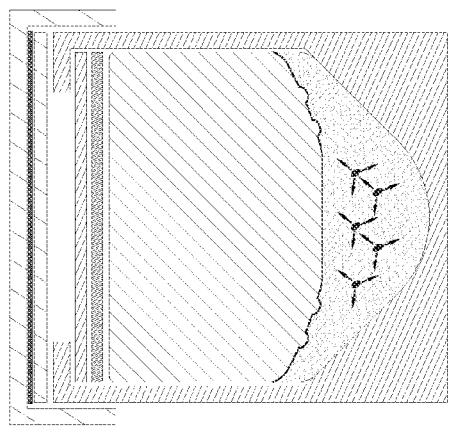
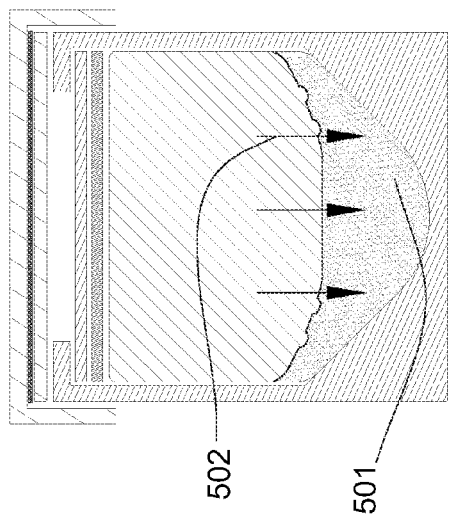
Fig. 12a
Fig. 12b
Fig. 12c
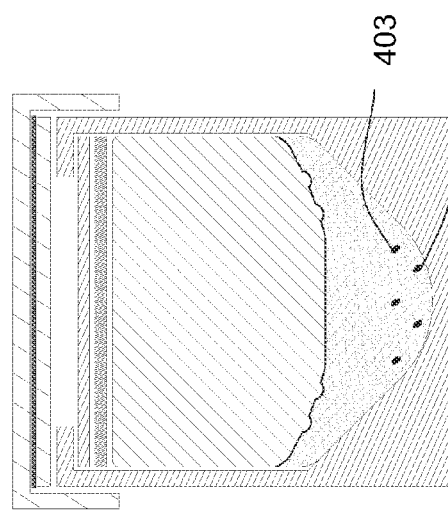
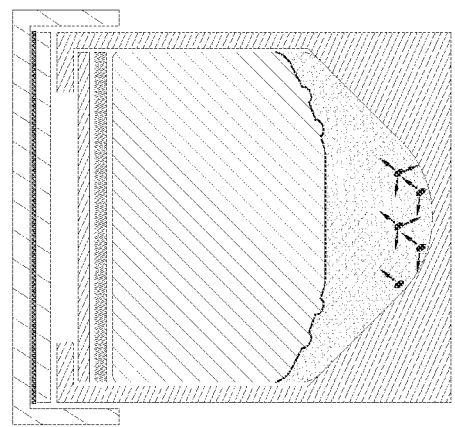
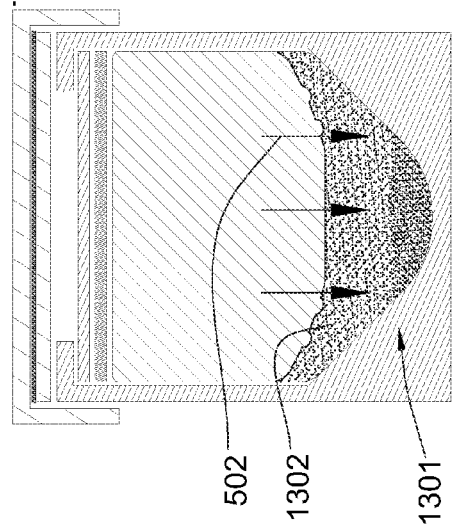
Fig. 13a
Fig. 13b
Fig. 13c

FORMING A POLYCRYSTALLINE CERAMIC IN MULTIPLE SINTERING PHASES

BACKGROUND OF THE INVENTION

This invention relates to sintered polycrystalline diamond, specifically sintered polycrystalline diamond that is formed in a high temperature high pressure press. The prior art discloses sintered polycrystalline diamond that utilizes metal catalysts to promote diamond growth.

U.S. Pat. No. 6,562,462 to Griffin et al., which is herein incorporated by reference for all that it contains, discloses a polycrystalline diamond or a diamond-like element with greatly improved wear resistance without loss of impact strength. These elements are formed with a binder-catalyzing material in a high-temperature, high-pressure (HTHP) process. The PCD element has a body with a plurality of bonded diamond or diamond-like crystals forming a continuous diamond matrix that has a diamond volume density greater than 85%. Interstices among the diamond crystals form a continuous interstitial matrix containing a catalyzing material. The diamond matrix table is formed and integrally bonded with a metallic substrate containing the catalyzing material during the HTHP process. The diamond matrix body has a working surface, where a portion of the interstitial matrix in the body adjacent to the working surface is substantially free of the catalyzing material, and the remaining interstitial matrix contains the catalyzing material. Typically, less than about 70% of the body of the diamond matrix table is free of catalyzing material.

U.S. Pat. No. 4,518,659 to Gigl et al., which is herein incorporated by reference for all that it contains, discloses a method for the high pressure/high temperature catalyst sweep through process for making diamond and cubic boron nitride compacts has been improved by adding and intermediate alloy. The added metal (whether alone or contained in an alloy) has a melting point below that of the catalyst (e.g. cobalt), is miscible with the catalyst, and preferably sweeps through the mass of abrasive crystals first.

BRIEF SUMMARY OF THE INVENTION

In one aspect of the invention, a method of forming polycrystalline diamond comprises providing a can assembly comprising a preform of diamond powder with a first catalyst, the preform being adjacent a solid substrate with a second catalyst. The pressure and/or temperature on the can assembly increases until the first catalyst and carbon from the diamond powder begin to form a melting composition within the preform. The pressure and temperature may be held substantially constant on the can assembly until the melting composition has catalyzed crystalline growth in at least a portion of the preform. The pressure and/or temperature are then increased on the assembly until the second catalyst within the substrate is released into the preform.

The first catalyst and the carbon from the diamond powder may form a melting composition. The first and the second catalyst may comprise cobalt. The first catalyst may have a concentration in the preform of 3% to 14% by weight. A melting temperature that melts the first catalyst may be lower than a release temperature that releases the second catalyst from the substrate. The melting temperature may be between 1300 C and 1400 C while the release temperature may be between 1400 C and 1500 C.

The first catalyst may comprise a cemented metal carbide, like tungsten carbide. The cemented metal carbide may contribute to forming the melting composition. The cemented metal carbide may comprise 1% to 7% of the preform by weight.

A desired first catalyst percentage by weight may be produced by milling the diamond powder with pellets comprising the first catalyst material in a non-oxidizing fluid. The non-oxidizing fluid may comprise acetone. A further step may comprise cleaning the diamond powder by heating the mixture in a hydrogen environment such that oxygen is removed from the mixture to form water vapor. The diamond powder may also cleaned by heating the mixture in a vacuum environment and removing oxygen by forming carbon monoxide. The can assembly may then be sealed by melting a sealant located between the can and the lid.

The pressure may be held between 70 and 90 kilobars for 2 to 5 minutes. Increasing the temperature and the pressure on the assembly after the second catalyst is released lasts for 1 to 3 minutes.

BRIEF DESCRIPTION OF THE DRAWINGS

FIG. 8a discloses a cross-sectional view of another embodiment of a can assembly.

FIG. 8b discloses a cross-sectional view of another embodiment of a can assembly.

FIG. 8c discloses a cross-sectional view of another embodiment of a can assembly.

FIG. 9a discloses a cross-sectional view of another embodiment of a can assembly.

FIG. 9b discloses a cross-sectional view of another embodiment of a can assembly.

FIG. 9c discloses a cross-sectional view of another embodiment of a can assembly.

FIG. 12a discloses a cross-sectional view of another embodiment of a can assembly.

FIG. 12b discloses a cross-sectional view of another embodiment of a can assembly.

FIG. 12c discloses a cross-sectional view of another embodiment of a can assembly.

FIG. 13a discloses a cross-sectional view of another embodiment of a can assembly.

FIG. 13b discloses a cross-sectional view of another embodiment of a can assembly.

FIG. 13c discloses a cross-sectional view of another embodiment of a can assembly.

DETAILED DESCRIPTION OF THE INVENTION AND THE PREFERRED EMBODIMENT

Figure 1:
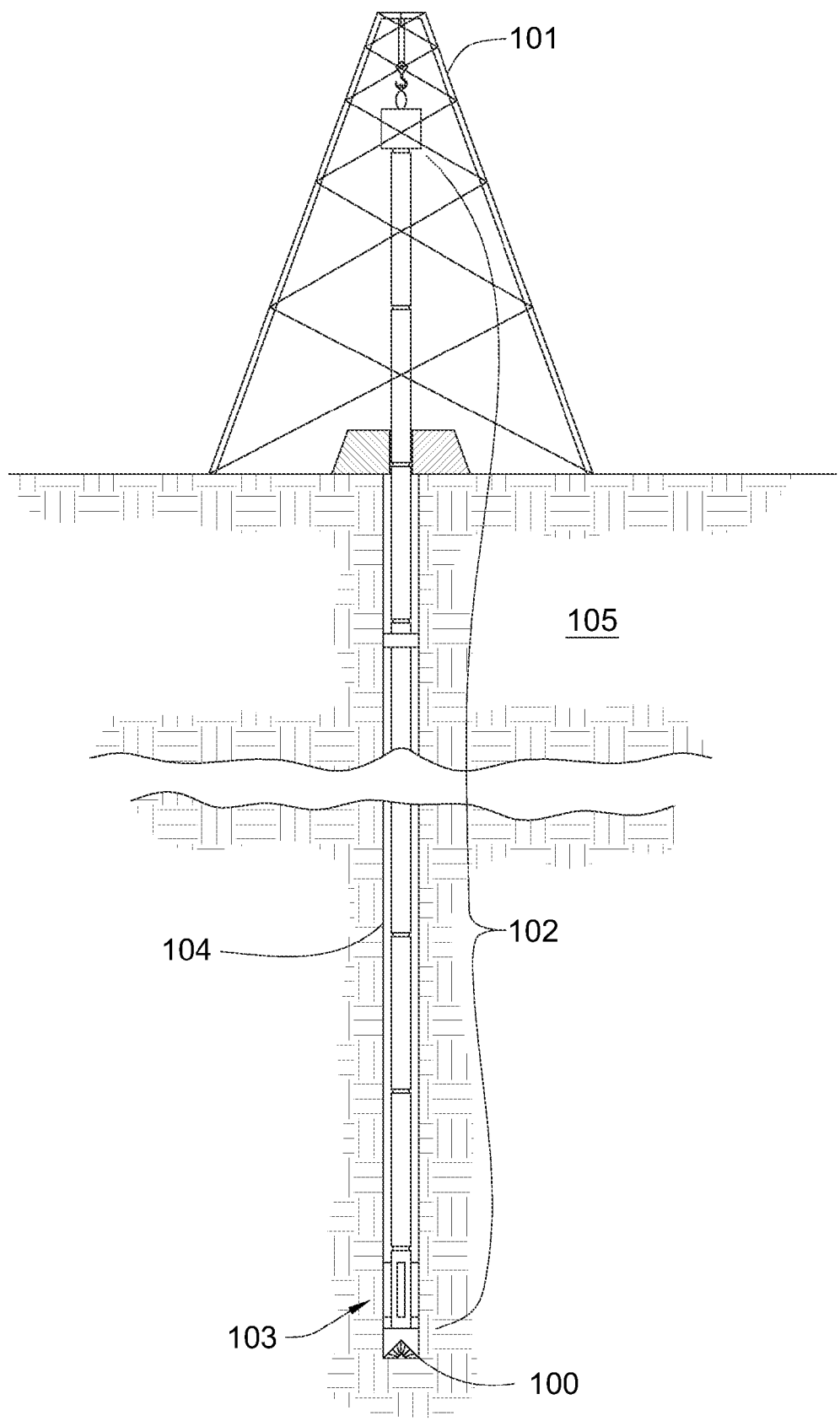
FIG. 1 discloses an orthogonal view of an embodiment of a drill string.

FIG. 1 discloses an embodiment of a drill string 102 with a drill bit 100 located on a distal end. The drill string 102 may be configured to rotate in a borehole 104. The drill string 102 may rotate the drill bit 100, causing the drill bit 100 to degrade an end of the borehole 104. Replacing worn drill bits is often costly, so the drill bit 100 may be configured to last as long as possible. To facilitate drill bit life, a plurality of cutting elements on the drill bit 100 may be comprised of a superhard material, like sintered polycrystalline diamond.

Figure 2:
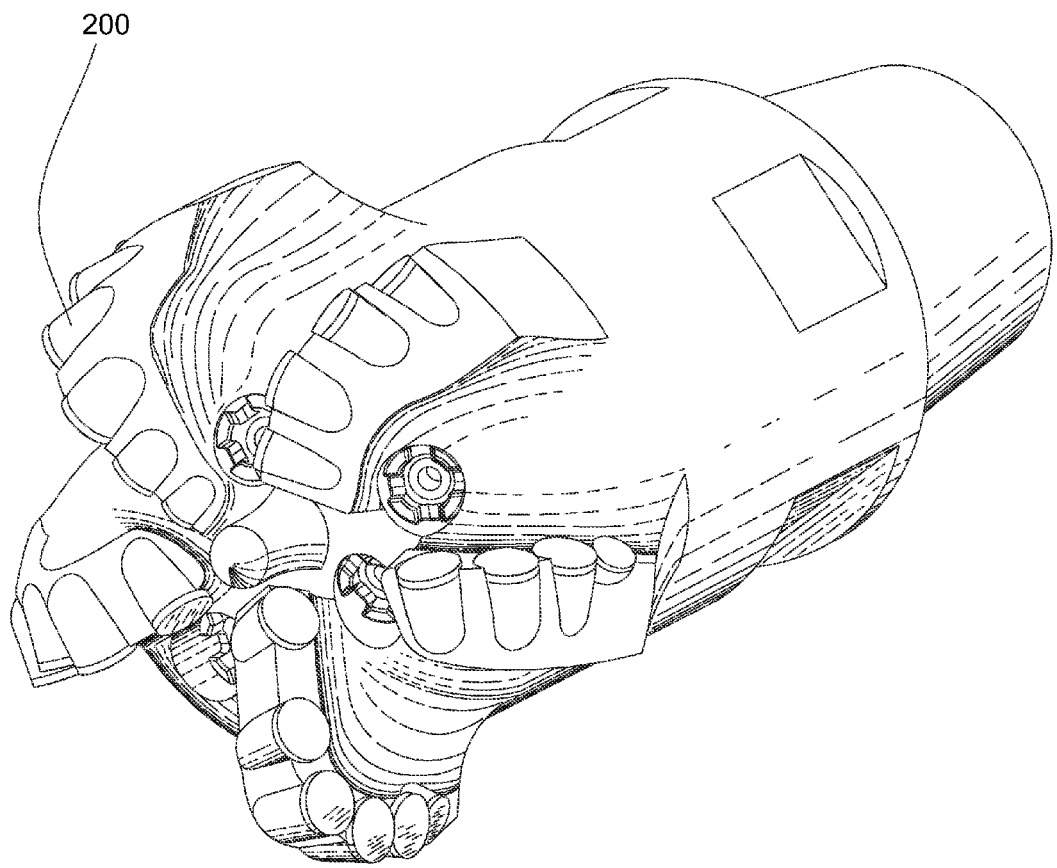
FIG. 2 discloses a perspective view of an embodiment of a drill bit.

FIG. 2 discloses an embodiment of the drill bit 100 with a plurality of cutting elements 200. The plurality of cutting elements 200 may comprise polycrystalline diamond, cemented metal carbides, tungsten carbide, cobalt, a small amount of other types of metals, and combinations thereof. The drill bit 100 may be configured to rotate against the formation to degrade a bottom of the borehole 104.

Figures 3A, 3B:
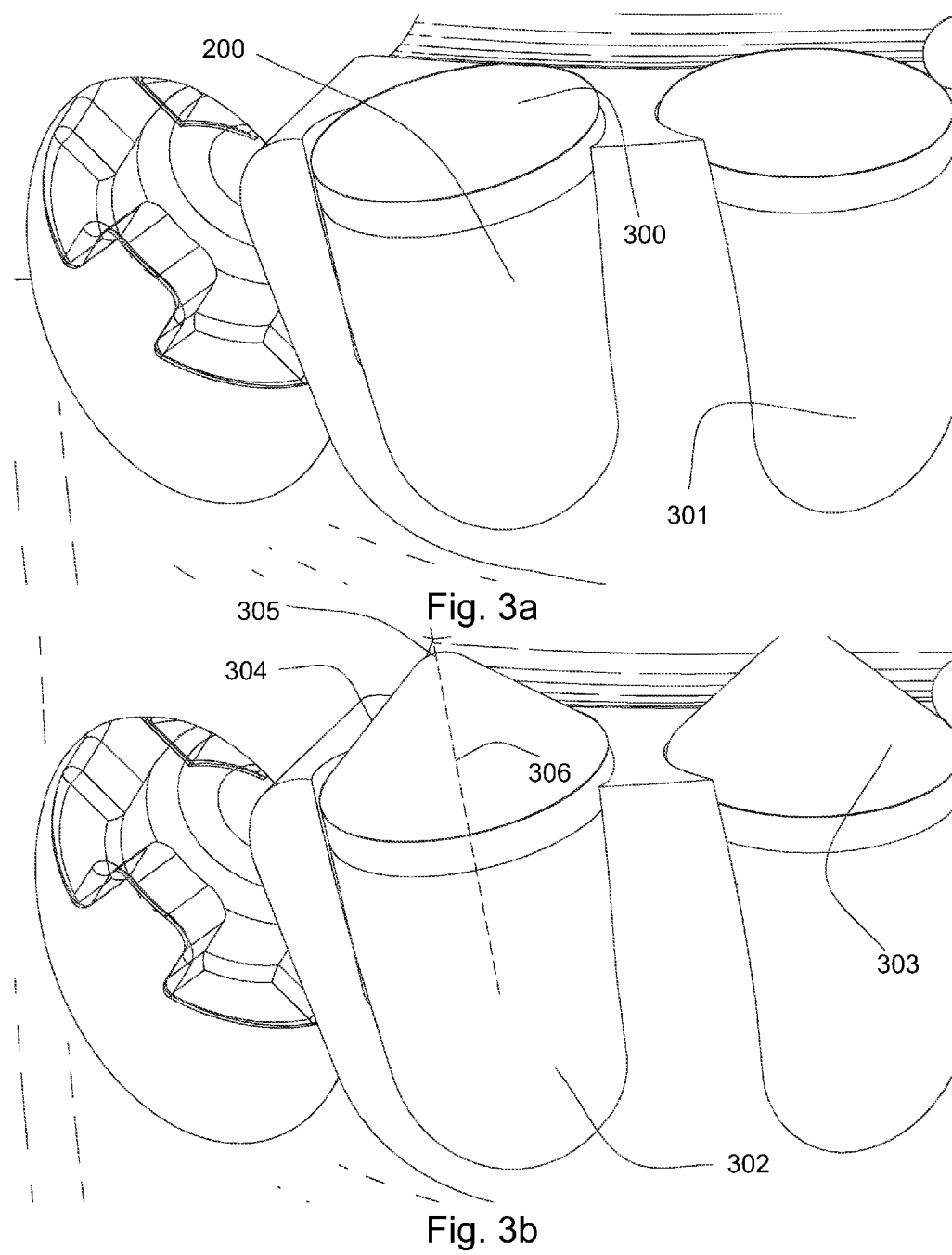
FIG. 3a discloses a perspective view of another embodiment of a drill bit.
FIG. 3b discloses a perspective view of another embodiment of a drill bit.

FIG. 3a discloses a plurality of shear cutters 200 affixed to a blade of a drill bit. The shear cutters 200 may comprise diamond 300 on at least one end that contacts the earthen formation. The shear cutters 200 may comprise a substrate 301 of at least mostly tungsten carbide. The substrate may be attached to the diamond 300. The plurality of cutters 200 may degrade the earthen formation through a shear force generated from rotating the drill bit 100.

FIG. 3b discloses a plurality of cutting elements 200, with a diamond working end 303 that comprises a pointed geometry. The diamond working end 303 may have a central axis 306 that intersects an apex of the pointed geometry 305. The central axis 306 may be oriented between a 25 and 85 degree positive rake angle measured from the pushing vector generated from the drill bit's rotation. The embodiment of FIG. 3b comprises the cutting element 303 with a side wall angle 304 of 60 degrees.

Figure 4A:
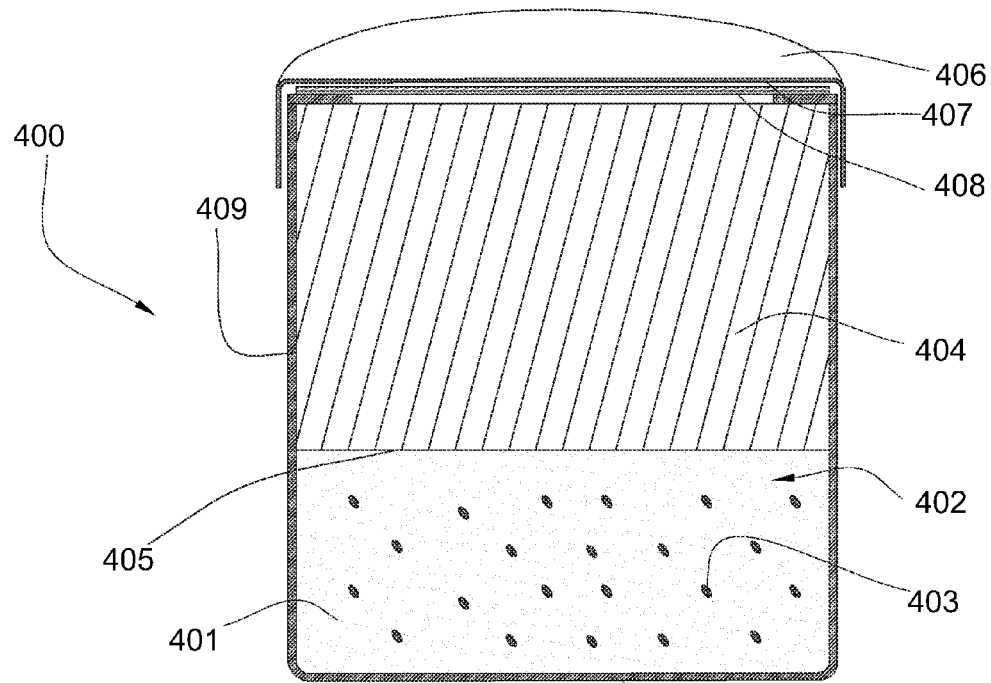
FIG. 4a discloses a cross-sectional view of an embodiment of a can assembly.

FIG. 4a discloses an embodiment of a can assembly 400 for high temperature, high pressure processing. The can assembly 400 may house a diamond preform 401 located in the bottom of the can 409 and a cemented metal carbide substrate 404 may be adjacent the diamond preform. During the high temperature, high pressure processing, the diamond preform is convert into sintered polycrystalline diamond.

In the preferred embodiment, the diamond preform comprises diamond powder 402 and a first catalyst 403. Preferably, the first catalyst comprises a cemented metal carbide. Some embodiments may contain additional metals and/or catalysts, such as cobalt, as part of the first catalyst. The first catalyst constituents 403 may be larger, smaller, or similar in size to the diamond powder particles. Preferably, the first catalyst is dispersed evenly throughout the diamond preform. The first catalyst 403 may comprise from 1% to 7% of the preform 401 by weight. However, in some embodiments, the first catalyst concentration is between 4.5% to 5% by weight.

The mixing process may include combining the diamond powder 402 and first catalyst 403 by milling the diamond powder 402 with pellets comprising the first catalyst material 403 in a non-oxidizing fluid. The fluid may need to be non-oxidizing to protect the first catalyst 403 from erosion in the milling process. The non-oxidizing fluid may comprise acetone. Acetone is an organic compound and has the formula $(CH_3)_2CO$. Acetone may be used as a solvent to help remove impurities form the diamond powder 402 and the first catalyst 403.

The substrate 404 may comprise a non-planar interface 405 with the diamond preform. A non-planar interface is believed to contribute to an enhanced bond between the substrate and the resulting sintered polycrystalline diamond after high temperature, high pressure processing.

A lid 406, sealant 407, and disc 408 may all reside above the substrate 404 and close off the can assembly. Oxygen and other molecules present in the ambient air may interfere with the chemical reactions occurring in the preform during high temperature, high pressure processing. Thus, the lid seals off the can assembly in an inert environment after impurities from the diamond preform have been removed. This purifying process may comprise heating the can assembly in a hydrogen environment that encourages oxygen to form a water vapor that vents out of the lid before the lid is sealed to the can 409. Another purification method may comprise heating the diamond powder under vacuum and removing oxygen by forming carbon monoxide. In some embodiments, the sealant 407 comprises copper.

Figure 4B:
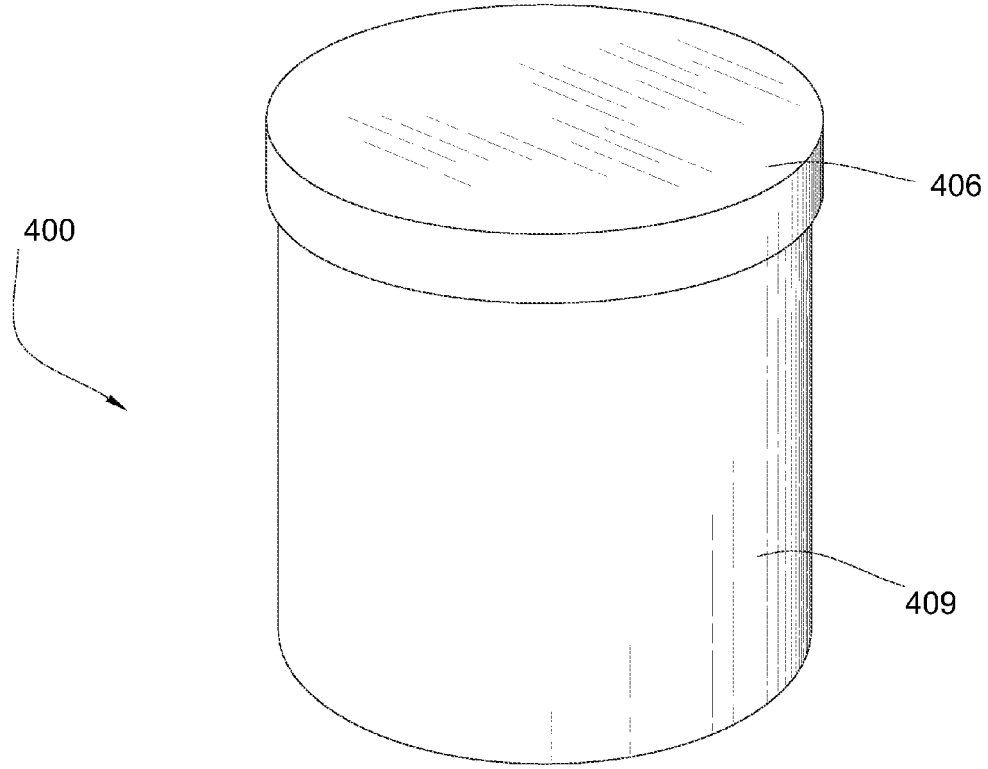
FIG. 4b discloses a perspective view of another embodiment of a can assembly.

FIG. 4b is a perspective view of the can assembly 400. The can 409 may be cylindrical in shape. While not shown in the figures, after assembling, the can assembly is placed in an opening of a cube. The space between the wall of the cube's opening and the can assembly is packed with a pressure distributing material, such as salt. The cube is then placed within a chamber of a high temperature, high pressure press. The press may comprise an anvil for each face of the cube. During the high temperature, high pressure processing, the anvils extend to pressurize each cube face. The cube may be heated while under pressure from the anvils through resistive heaters located within the cube. This heat and pressure is designed to reach the diamond preform and convert the preform into sintered polycrystalline diamond.

Figure 5A:
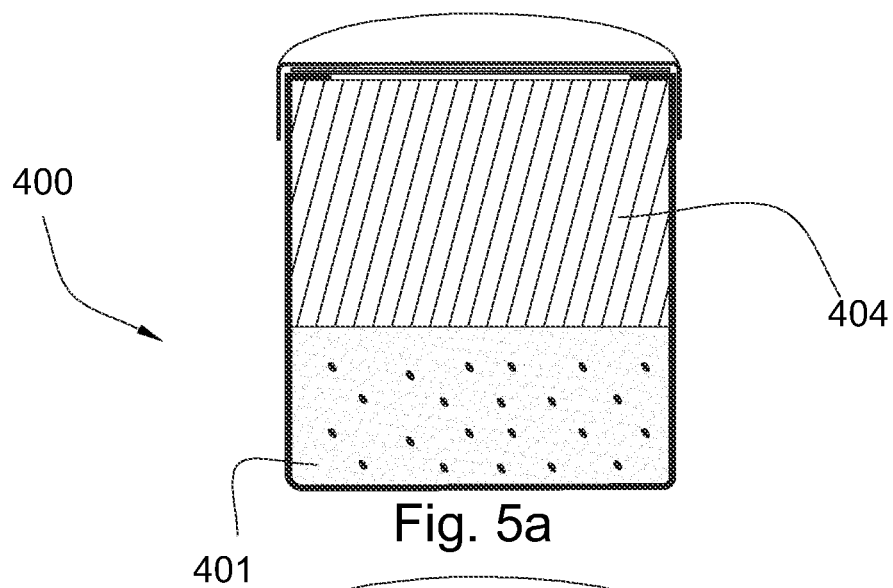
FIG. 5a discloses a cross-sectional view of another embodiment of a can assembly.

FIG. 5a discloses the assembly 400 comprises the preform 401 and the substrate 404 configured to be set into a press. The press may be able to apply pressure and heat to the can assembly 400 to convert the preform into sintered polycrystalline diamond. Pressure and heat may be increased until a first melting temperature that causes the first catalyst to melt is reached. Preferably, the collective characteristics of the first catalyst's constituents cause the constituents to collectively melt at a temperature lower than the constituents would have melted individually. In some embodiments, the melting composition is a eutectic composition. The melting temperature may be defined as a temperature at which a mixture of elements begins to change from a solid phase to a liquid phase.

Figure 5B:
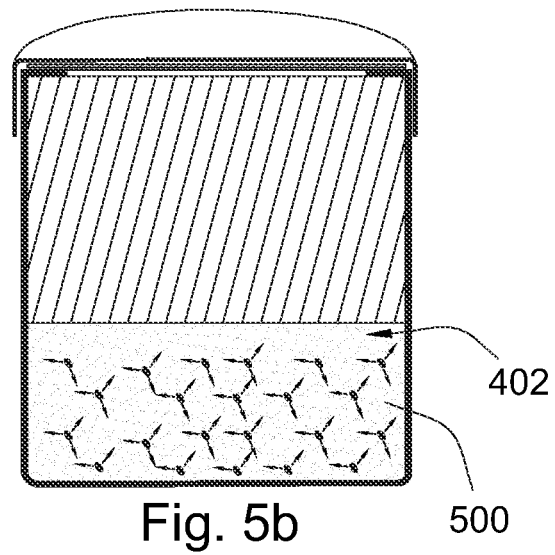
FIG. 5b discloses a cross-sectional view of another embodiment of a can assembly.

FIG. 5b discloses the first catalyst melting in the preform 401. Carbon in the diamond powder 402 and the first catalyst 403 may form a melting composition 500 that results in the first catalyst melting at a temperature lower than the first catalyst would have otherwise melted. The first catalyst 403 may be mixed with the diamond powder 402 in a manner that leads the first catalyst 403 and carbon in the diamond powder 402 to melt at a eutectic temperature. As the constituents of the first catalyst melt, they may spread throughout the preform 401, fill voids between diamond grains, and catalyze diamond growth. The first catalyst 403 may be substantially evenly distributed within the preform 401.

During this step of forming polycrystalline diamond, the pressure and/or temperature may be adjusted so that substantially only the catalyst in the perform melts. At this stage, it may not be desirable for the second catalyst in the substrate to melt and enter to the preform. The temperature and pressure may be held within ranges that cause at least a portion of the preform to catalyze by the melting first catalyst. In some embodiments, the temperature and/or pressure may be held substantially constant during this step.

Cobalt may be used as part of the melting composition 500 to help lower the melting temperature. The cobalt may be placed in the first catalyst 403 to assist in lowering a melting point. The melting composition 500 may cause sintering to occur at a lower temperature. Lowering the temperature may lower the pressure necessary to convert the preform into sintered polycrystalline diamond. Using lower pressures may be safer and less expensive. Also, a lower pressure may allow the sintered polycrystalline diamond to be formed into a greater number of shapes. A lower processing temperature may also result in lower internal stresses in sintered polycrystalline diamond.

Preferably, at the end of the step of melting the first catalyst, most of the diamond particles and first catalyst are converted into sintered polycrystalline diamond. Also, the first catalyst constituents preferably reacted with dissolved carbon to produce cemented metal carbide. For example, if the first catalyst comprises 1% to 7% percent of tungsten carbide and cobalt by weight before the first catalyst melts, after melting the first catalyst, the amount of tungsten carbide may increase to higher percentage of tungsten carbide.

This cemented metal carbide may fill the voids between sintered diamond grains. The cemented metal carbides' properties, such as compressive strength and thermal expansion rate, may be more similar to those properties of diamond than more traditional residual metals left behind in the sintered polycrystalline diamond's voids. Thus, the sintered polycrystalline diamond and residual metal may behave more uniformly. For example, the strength of the cemented metal carbide may support the diamond grains better under large impacts. Also, the cemented metal carbide may thermally expand at a rate closer to the expansion of the diamond, and thereby, induce less internal stress on the sintered polycrystalline diamond in hot applications.

Figure 5C:
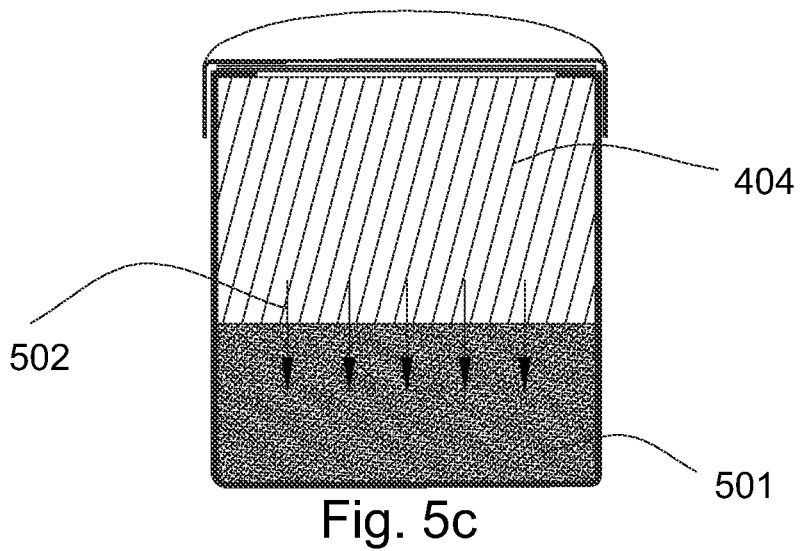
FIG. 5c discloses a cross-sectional view of another embodiment of a can assembly.

FIG. 5c discloses the second catalyst, which is in the substrate 404, beginning to enter into the preform/sintered polycrystalline diamond 501. Here, the pressure and/or temperature exerted onto the can assembly may be adjusted to cause the second catalyst to melt. At this stage, the preform may be fully or partially converted into sintered polycrystalline diamond 501.

Increasing the pressure and/or temperature on the assembly 400 may cause the second catalyst 502 within the substrate 404 to release into the preform 401. The second catalyst 502 may enter into preform/sintered polycrystalline diamond and fill voids, catalyze unsintered diamond, and bond the substrate to the sintered polycrystalline diamond.

During the high temperature, high pressure processing, some of the carbon in the diamond grains may dissolve and react with the first catalyst to form cemented metal carbide. The residual metal concentration, comprising the first and/or the second catalyst, 502 in the polycrystalline diamond 501 may be 0.05% to 14% by weight. The residual metal in the interstitial regions may be mostly tungsten carbide with some cobalt.

Figure 6A:
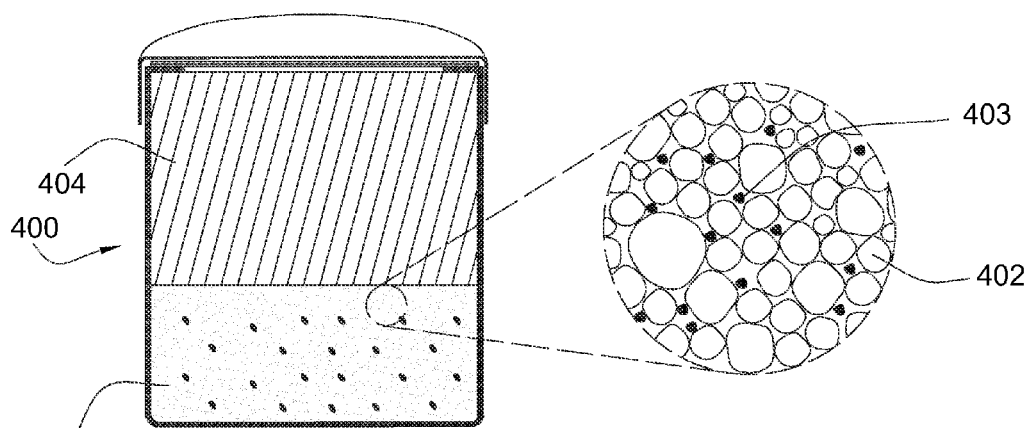
FIG. 6a discloses a break-away view of another embodiment of a can assembly.
Figure 6B:
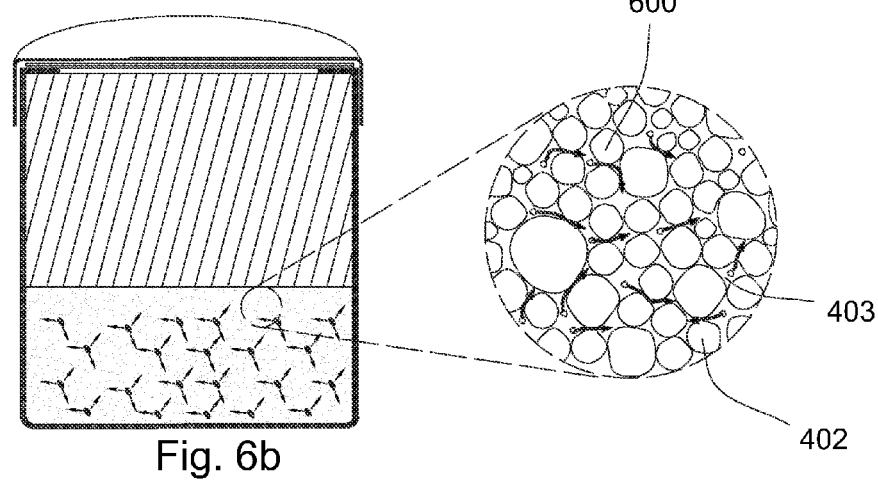
FIG. 6b discloses a break-away view of another embodiment of a can assembly.
Figure 6C:
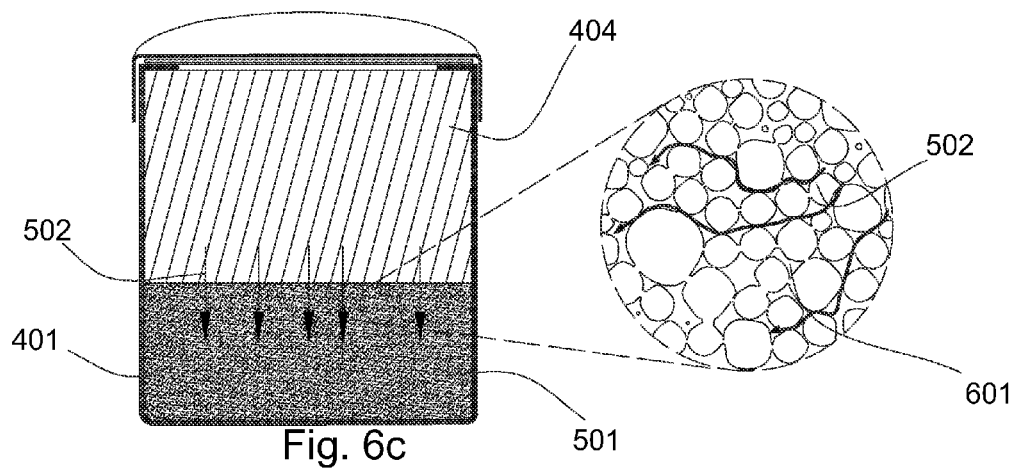
FIG. 6c discloses a break-away view of another embodiment of a can assembly.

FIGS. 6a, b, and c are break-away views that disclose the process of crystallization in the can assembly 400. FIG. 6a discloses that the diamond grains 402 are compacted together, but still independent of each other. The first catalyst 403 is mixed with the diamond grains. FIG. 6b discloses the first catalyst 403 spreading through out the diamond grains and stimulating crystallization 600. This step that causes the first catalyst to melt, without a substantial amount or any of the second catalyst entering the preform/sintered polycrystalline diamond transition. FIG. 6c discloses the second catalyst 502 as a liquid entering into voids 601 in the polycrystalline diamond 501 for attachment.

Figure 7:
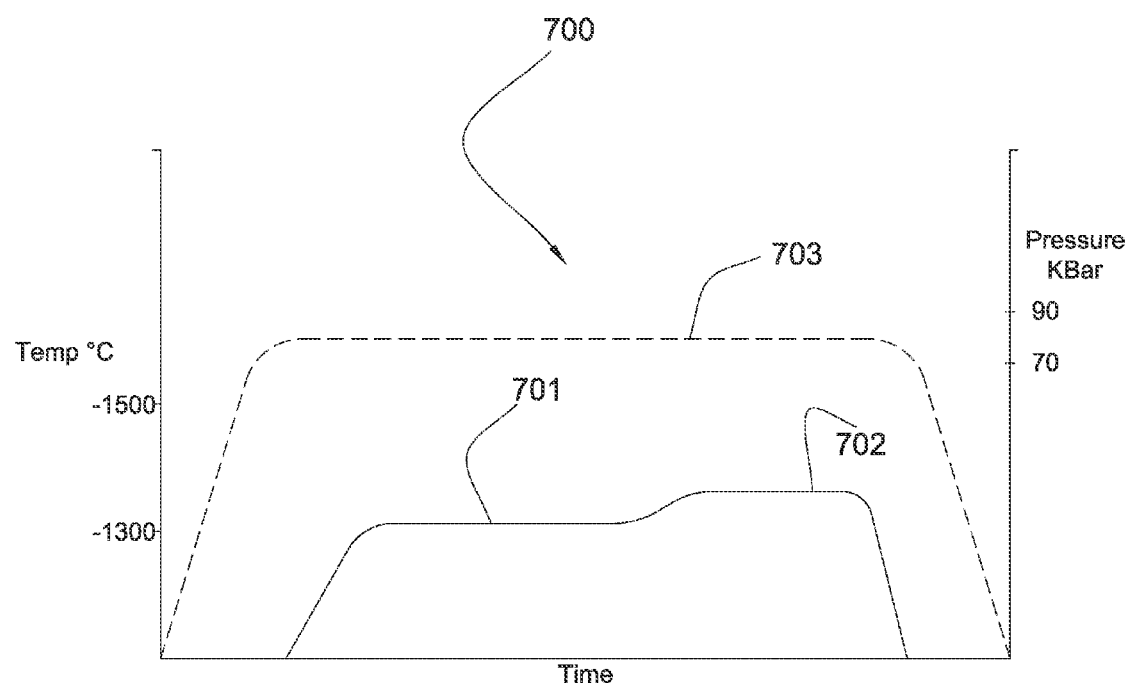
FIG. 7 discloses an embodiment of a graph of a temperature/pressure vs. time.

FIG. 7 discloses a graph 700 of an embodiment of the temperatures and pressures against time during the sintering process. The lower temperature 701 may represent the stage where the first catalyst melts, while the higher temperature 702 may represent the second catalysts melts. The lower temperature 701 may be between 1300 and 1400 degrees Celsius. This temperature 701 depends on the amount of cobalt and cemented metal carbide particulars are initially in the preform 401. Varying the amount of metal in the preform 401 changes the temperature at which the preform begins to crystallize. The can assembly may be subjected to the lower temperature for two to five minutes, which may provide enough time for the entire preform to convert into sintered polycrystalline diamond.

After the desired duration at the lower temperature 701, the temperature may be increased for an additional duration of one to three minutes. The higher (release) temperature should cause the second catalyst to melt and flow into the diamond. The release temperature 702 may be between 1400 and 1500 degrees Celsius.

The pressure may be held substantially constant at 70 to 90 kilobars during the lower and higher temperatures. Holding the pressure constant may allow for the best grain growth in the diamond 501.

FIGS. 8a, b, and c disclose a preform with the first catalyst concentrated at the working end 800. During the step of melting the first catalyst, the pressure and temperature are adjusted to cause most, if not all, of the sintering to occur just at the working end. An attachment section 801 of the preform may be catalyzed during the attachment stage when the second catalyst is released from the substrate.

Thus, the working end 800 and attachment section 801 may exhibit different properties. For example, the high concentration of residual cemented metal carbide in the working end (resulting from the first catalyst constituents) may cause the working end to have a more uniform thermal expansion coefficient than the commercially available diamond products currently on the market. However, the attachment section 801, may be tougher than the working end allowing the attachment section to handle the high internal stresses commonly experienced at a bonded interface between sintered polycrystalline diamond and a cemented metal carbide substrate.

FIGS. 9a, b, and c disclose concentrating the first catalyst 403 adjacent the diamond/substrate interface 950. Here, the preform adjacent the substrate will convert into sintered polycrystalline diamond partially or completely before second catalyst is released from the substrate. This process may result in less of the second catalyst reaching the diamond particles in the working end of the preform and thereby controlling the catalyst concentration in the working end. Thus, the sintered polycrystalline diamond adjacent the interface may be a catalyst barrier that regulates the second catalyst flow. By adjusting the amount and location of the first catalyst, as well as the pressure, temperature, and duration of the step of melting the first catalyst, the size, thickness, density, geometry of a sintered polycrystalline diamond barrier may be controlled. The barrier's features may determine the amount of second catalyst that may pass through, and thereby control the physical characteristics, such as toughness and thermal expansion, of the sintered polycrystalline diamond that is eventually formed at the working end.

Figure 10A:
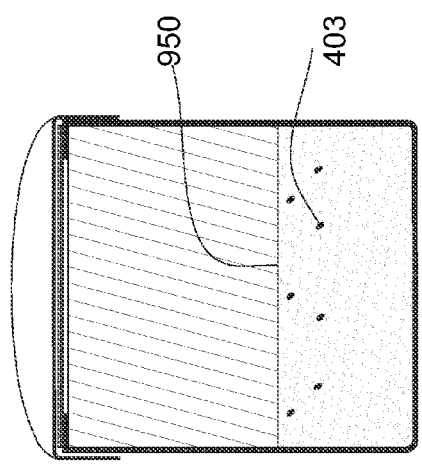
FIG. 10a discloses a cross-sectional view of another embodiment of a can assembly.
Figure 10B:
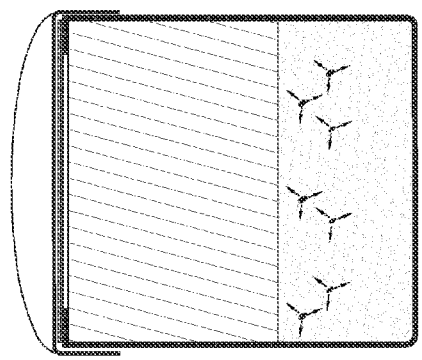
FIG. 10b discloses a cross-sectional view of another embodiment of a can assembly.
Figure 10C:
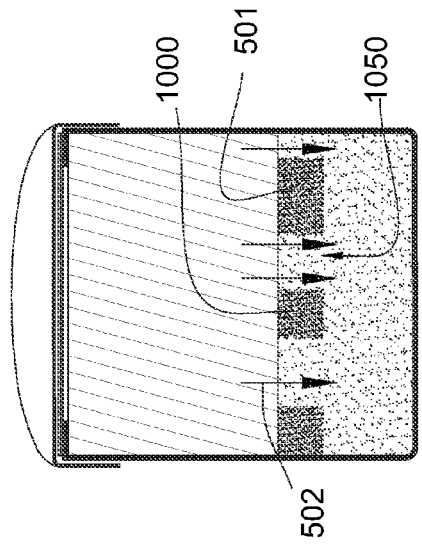
FIG. 10c discloses a cross-sectional view of another embodiment of a can assembly.

FIGS. 10a, b, and c disclose the first catalyst 403 in groups near the interface 950. The grouping may cause a sintered polycrystalline diamond barrier 1000 with a plurality of openings 1050. The second catalyst 502 may sweep through the openings into the unsintered portion of the preform. The size of the openings may affect the amount of second catalyst the working end, and thereby affect the working end's physical characteristics. Also, the diamond and second catalyst may promote better bonding in the barrier's opening between the preform and the substrate than promoted by the first catalyst.

Figure 11A:
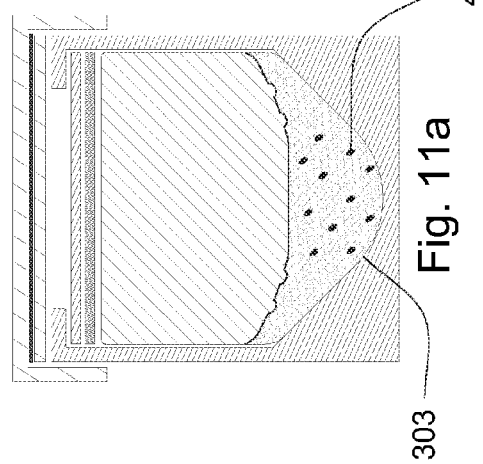
FIG. 11a discloses a cross-sectional view of another embodiment of a can assembly.
Figure 11B:
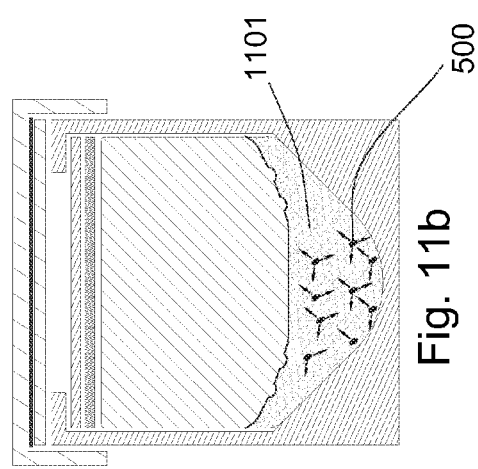
FIG. 11b discloses a cross-sectional view of another embodiment of a can assembly.
Figure 11C:
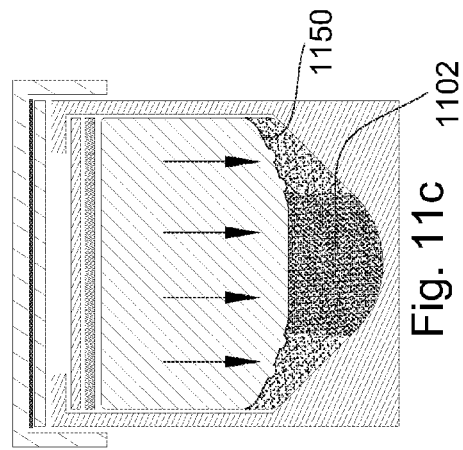
FIG. 11c discloses a cross-sectional view of another embodiment of a can assembly.

FIGS. 11a, b, and c disclose a perform with a pointed geometry 303. The pointed geometry 303 may allow the resulting sintered polycrystalline diamond to penetrate formations with less impact energy. The first catalyst 403 may be concentrated towards the central axis of the preform effectively forming a sintered polycrystalline diamond column 1102 before the second catalyst sweeps through the remainder of the preform. This arrangement may be advantageous because the pointed geometry may experience the highest loads along its central axis. The more uniform characteristics of the diamond sintered by the first catalyst may be better suited to accommodate these loads. The second catalyst may promote bonding between the diamond and the substrate on the peripheral regions of the interface 1150.

FIGS. 12a, b, and c disclose the first catalyst 403 distributed evenly throughout the preform 401 with a pointed geometry.

FIGS. 13a, b, and c disclose another of a preform with a pointed geometry 303. Here, the first catalyst 403 is concentrated around an apex 1350 of the pointed geometry. Thus, the first catalyst will sinter the tip, while the second catalyst will sinter the remainder 1302 of the preform.

Figure 14:
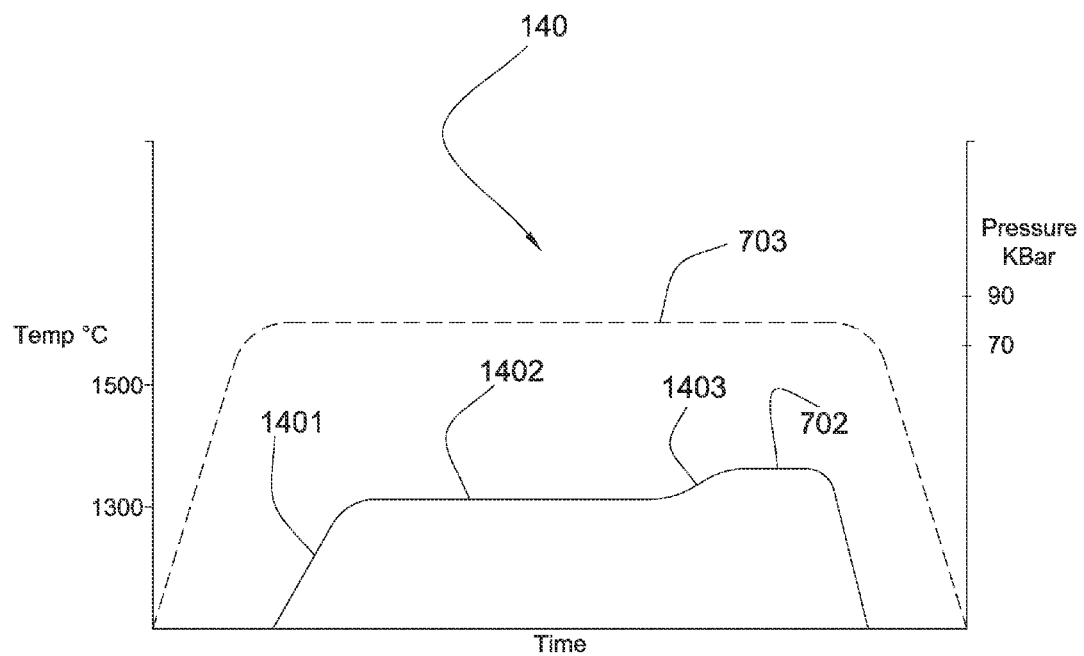
FIG. 14 discloses an embodiment of another graph of a temperature/pressure vs. time.

FIG. 14 discloses another embodiment of a method of forming the polycrystalline diamond 501. The duration of the lower temperature 1401 may be increased, which may allow the first catalyst 403 to more fully sinter the preform 401.

While the pressure has been shown to be consistent through the heated portions of the high temperature, high pressure processing, some embodiments include altering the pressure during the heated phases of the sintering process.

Applications that may incorporate the present invention may include downhole drilling, excavation, trenching, construction, dredging, milling, and electronics.

Specifically, the resulting sintered polycrystalline diamond may be incorporated on drill bits, picks, hammers, nose cones, mills, hammer mills, cone crushers, jaw crushers, circuit boards, and combinations thereof.

Whereas the present invention has been described in particular relation to the drawings attached hereto, it should be understood that other and further modifications apart from those shown or suggested herein, may be made within the scope and spirit of the present invention.

What is claimed is:

1. A method of forming polycrystalline diamond, comprising the steps of:

providing a can assembly comprising a mixture of diamond powder and a first catalyst, the mixture having a catalyst region and a substantially catalyst-free region, adjacent a solid substrate comprising a second catalyst;

increasing the pressure, temperature or both on the can assembly until a portion of the first catalyst and a portion of carbon from the diamond powder liquefy;

holding the pressure and temperature within ranges that allow the first catalyst to catalyze crystalline growth in portion of the diamond powder; and increasing the pressure, temperature or both on the assembly until a portion of the second catalyst releases from the solid substrate into the mixture.

2. The method of claim 1, wherein the first catalyst and the carbon from the diamond powder form a eutectic composition.

3. The method of claim 2, wherein a eutectic temperature that forms the eutectic composition is lower than a release temperature that releases the second catalyst from the substrate.

4. The method of claim 3, wherein the eutectic temperature is between 1300 degrees C. and 1400 degrees C.

5. The method of claim 3, wherein the release temperature is between 1400 degrees C. to 1500 degrees C.

6. The method of claim 1, wherein the first catalyst comprises a cemented metal carbide.

7. The method of claim 6, wherein the first catalyst comprises 1% to 7% of the mixture by weight.

8. The method of claim 6, wherein the cemented metal carbide is tungsten carbide.

9. The method of claim 1, wherein the first catalyst comprises cobalt.

10. The method of claim 1, further comprising forming the mixture of diamond powder and first catalyst by milling the diamond powder with pellets comprising the first catalyst in a non-oxidizing fluid.

11. The method of claim 10, wherein the non-oxidizing fluid comprises acetone.

12. The method of claim 1, further comprising cleaning the diamond powder by heating the diamond powder in a hydrogen environment and removing oxygen by forming water vapor.

13. The method of claim 1, further comprising cleaning the diamond powder by heating the diamond powder in a vacuum environment and removing oxygen by forming carbon monoxide.

14. The method of claim 1, further comprising sealing a lid to the can assembly by melting a sealant located between the can assembly and the lid.

15. The method of claim 1, wherein the method causes the polycrystalline diamond to have a catalyst concentration by weight of 0.05% to 14%.

16. The method of claim 1, wherein the method causes the polycrystalline diamond to have tungsten located within its interstitial regions.

17. The method of claim 1, wherein holding the temperature and pressure includes holding the pressure between 70 and 90 kilobars.

18. The method of claim 1, wherein holding the temperature and pressure continues for 2 to 5 minutes.

19. The method of claim 1, wherein the second step of increasing the pressure, temperature or both continues for 1 to 3 minutes.

20. The method of claim 1, wherein the step of holding the pressure and temperature comprises holding the temperature substantially constant.

* * * * *